Feb. 24, 1925.
A. ELWELL
SUN SHIELD
Filed June 30, 1921
1,527,544
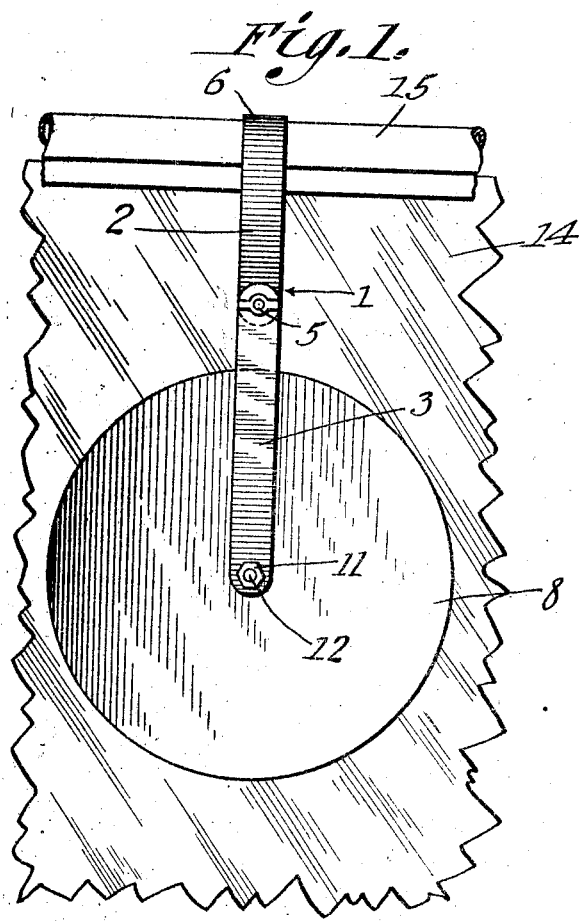
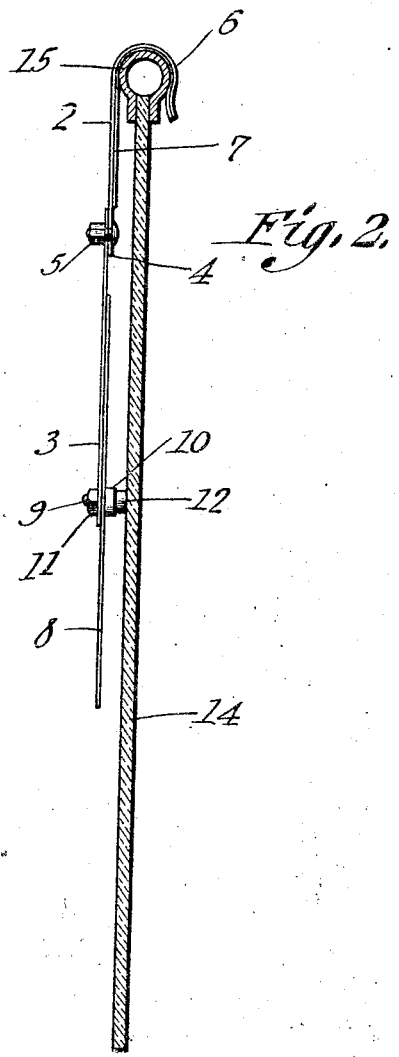
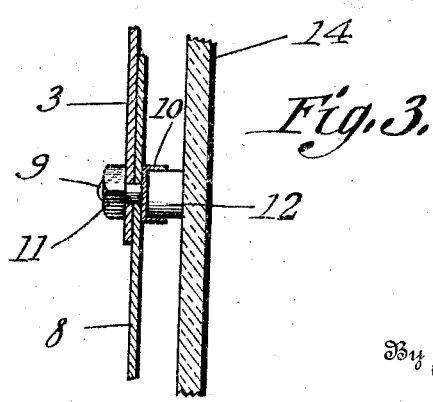
A. Elwell
Inventor Patented Feb. 24, 1925.

1,527,544

UNITED STATES PATENT OFFICE.

ABBIE ELWELL, OF FORT BENTON, MONTANA.

SUN SHIELD.

Application filed June 30, 1921. Serial No. 481,599.

*To all whom it may concern:*

Be it known that I, ABBIE ELWELL, a citizen of the United States, residing at Fort Benton, in the county of Chouteau and State of Montana, have invented a new and useful Sun Shield, of which the following is a specification.

The device forming the subject matter of this application is adapted to be mounted upon the wind shield of an automobile, for the purpose of shielding the eyes of the driver of the vehicle from the glare of the sun. The invention aims to provide novel means whereby the device may be mounted on a wind shield, and be adjusted as occasion may demand.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:—

Figure 1 shows in rear elevation, a device constructed in accordance with the invention, mounted on the wind shield of a vehicle; Figure 2 is an elevation wherein the device is viewed edgewise, the wind shield appearing in section; Figure 3 is an enlarged sectional detail.

In carrying out the invention, there is provided a suspension member denoted by the numeral 1. The suspension member is a composite structure, and includes an outer part 2 and an inner part 3, the parts 2 and 3 preferably in the form of metallic strips, having their ends overlapped as shown at 4. A clamping device 5, such as a bolt and wing nut, connect the overlapped ends 4 of the parts 2 and 3. The part 2 of the suspension member 1 terminates in a hook 6. A lining 7 is disposed within the hook 6 and extends well down on the part 2 toward the clamping device 5.

The article includes a body 8, in the form of a disk. The body 8 may be made of any suitable material, such as celluloid, if desired, and may be tinted any selected hue, the body 8 ordinarily being translucent or transparent. The lower end of the part 3 of the suspension member 1 is overlapped on the body 8 and is connected thereto by a securing element 9 which may be constructed as desired. The securing element 9 may be in the form of a bolt, provided at one end with a cup-shaped head or socket 10 adapted to engage one surface of the body 8. A nut 11 is threaded on the securing element or bolt 9 and engages the opposite surface of the body 8. A button or buffer 12 is mounted in the bead 10.

The numeral 14 marks the pane of a wind shield, the frame of the wind shield appearing at 15.

In practical operation, the hook 16 is engaged with the upper portion of the wind shield frame 15, the lining 7 preventing the frame from being marred by the hook. Since the lining 7 extends downwardly below the hook 6, the frame 15 will not be marred, whilst the hook 6 is pulled downwardly upon the frame, or is being slid along the top of the wind shield frame to the desired place. When the device is mounted in place, as shown in Figure 2, the button or buffer 12 bears against the pane 14, and, since the button or buffer is fashioned from resilient material such as rubber, there will be no objectionable noise or clatter, should the device vibrate. The inner part 3 of the suspension member 1 may be swung laterally in opposite directions on the bolt or clamping device, thereby to adjust the body 8 to such a position that it will shield and protect the eyes of the driver of the car. After the body 8 has been adjusted as aforesaid, the nut of the clamping device 5 may be tightened to hold the body 8 in any position to which it may have been adjusted. Although a specific form of clamping device has been shown and described, it will be understood that any suitable clamping means may be used at the place indicated. The hook 6 preferably grips the frame 15 with a reasonably strong frictional hold, the construction, however, being such that the hook may be placed upon the frame 15 and be disengaged therefrom, without difficulty.

I claim:—

A device of the class described comprising a suspension member provided at one end with supporting means; a body upon which the other end of the suspension member is overlapped; a securing element connecting the suspension member with the body and located approximately at the geometrical center of the body, the securing element including a head and a movable element, between which the suspension member and the body are engaged, the head having a socket, and an outstanding buffer located in the socket.

In testimony that I claim the foregoing as my own, I have hereto affixed my signature in the presence of two witnesses.

ABBIE ELWELL.

Witnesses:
CHAS. R. ELLIOTT,
P. J. THELEN.